United States Patent [19]
Rinella

[11] 3,954,172
[45] May 4, 1976

[54] BAIT BOX

[76] Inventor: Anthony J. Rinella, 2218 S. 59th Court, Cicero, Ill.

[22] Filed: Apr. 7, 1975

[21] Appl. No.: 565,768

[52] U.S. Cl. .................................. 206/1.5; 43/55; 70/63; 292/131
[51] Int. Cl.² .................. A01K 97/04; B65D 55/14; B65D 85/50
[58] Field of Search .................. 206/1.5; 70/63, 77, 70/158; 292/131, 231; 43/55

[56] References Cited
UNITED STATES PATENTS

| | | | |
|---|---|---|---|
| 1,733,772 | 10/1929 | Battershell | 206/1.5 |
| 3,828,899 | 8/1974 | Scott | 206/1.5 |

*Primary Examiner*—William T. Dixson, Jr.
*Attorney, Agent, or Firm*—Edward D. Gilhooly

[57] ABSTRACT

A bait box for carrying fishing material and the like including a rectangular box having a pair of oppositely disposed hinged doors and a central compartment. Each of the doors is designed to be opened when a respective door is disposed as the upper horizontal surface of the box through cooperation with an internal weighted drum. The drum includes a slot through a flange which cooperates with a projection on each of the doors to permit a door to be opened when oriented as the upper surface of the box. In other orientations, the doors are locked in a closed position by cooperation between the flange provided on the drum and either of the projections. The drum includes a weight which always orients the slot formed in the flange at an uppermost position in all orientations of the box to permit opening of either of the doors when disposed on the top of the box.

5 Claims, 6 Drawing Figures

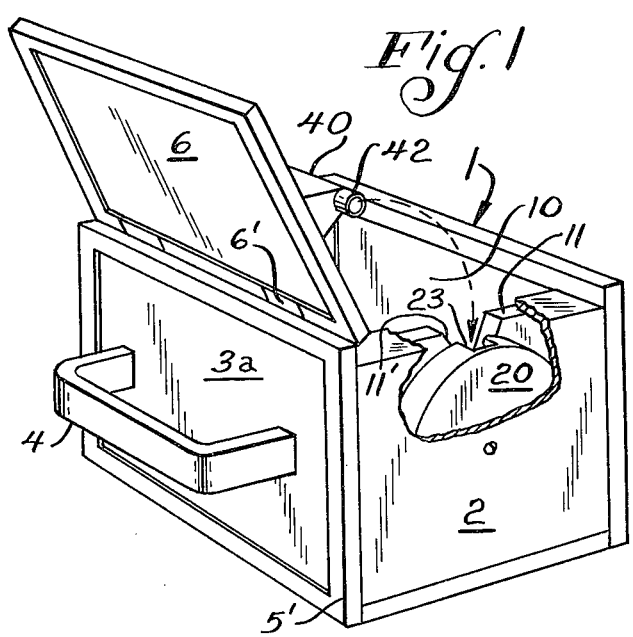
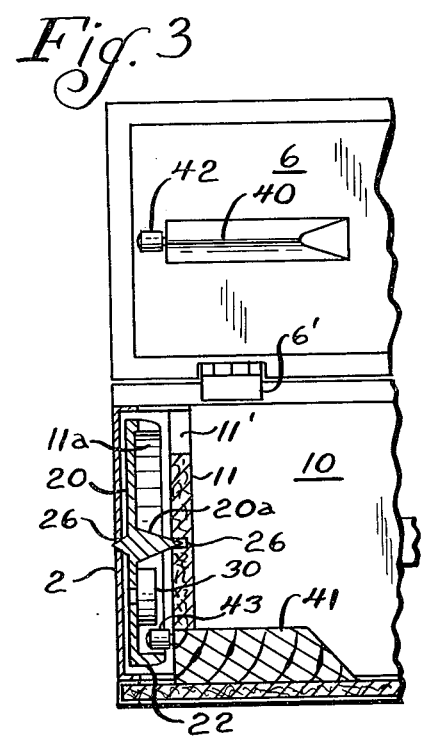
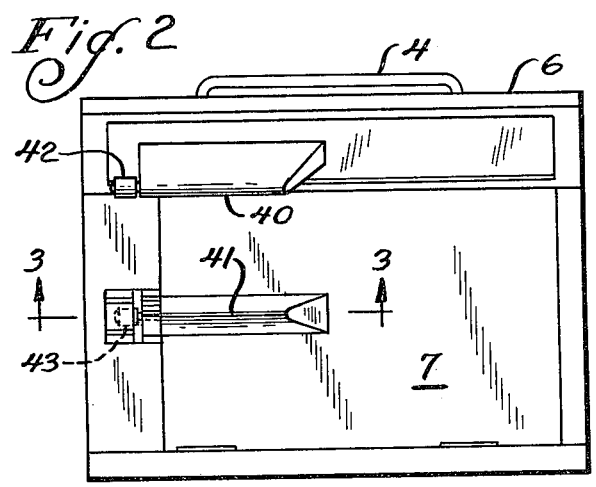
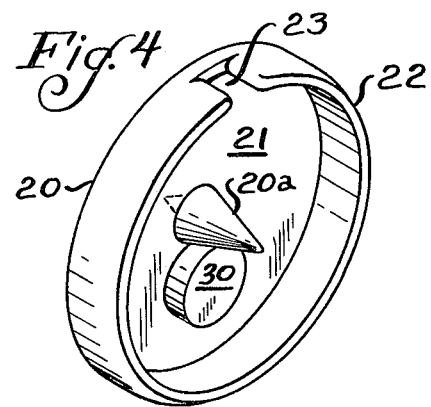
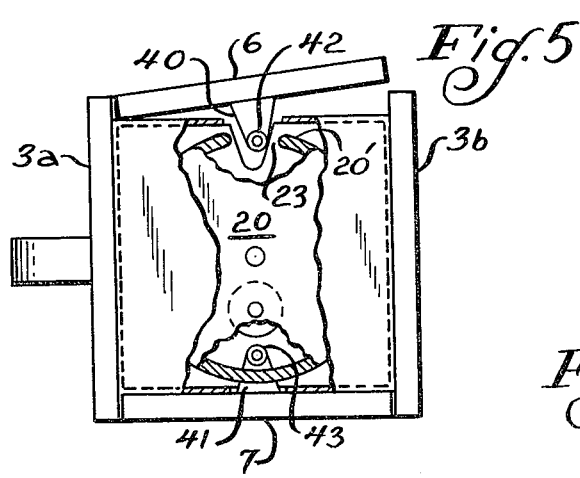
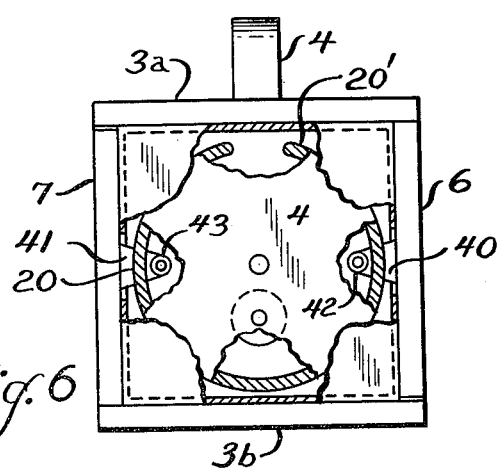

BAIT BOX

BACKGROUND OF THE INVENTION

This invention relates to containers for carrying and storing material and in particular, to a bait box having a pair of doors which are automatically lockable in certain orientations and which can be opened when disposed as the upper surface of the box.

More specifically, the invention relates to a bait box having an inner compartment and a weighted drum rotatably mounted therein. A slot is formed in a circumferential flange disposed on the drum and the slot is designed to always return to an uppermost position of the drum despite the orientation of the box. Thus, when one of the hinged doors is disposed as the upper surface of the box, the slot permits a projection mounted on the door to pass therethrough and allow opening of the door. As the box is reoriented moving the particular door to another planar orientation, it is automatically locked whereby the opposite door can be opened when it is oriented as the upper top surface of the box.

It is well-known in the past to carry fishing material and the like such as bait, equipment and the like in a rectangular shaped box having a pair of opposed doors. The opposed doors allow the user to have access to the interior of the box from opposite sides for convenient retrieval of material therein. It is commonly found that in use of such prior art bait boxes that the user overlooks locking the upper door when turning the box up side-down for access to the other door. This results because the prior art devices lock and unlock the access doors by manually operable locking mechanisms or latches. Thus, when the user fails to latch or lock the door when turning the box over, material within the container can fall from the container to the ground and the like.

Moreover, the design of many of the latches used to secure the doors of such containers can open during transporting even after being locked to cause spilling of the contents of the box. It is therefore desirable in the art to provide a container which permits easy opening of a door as it is oriented as the upper horizontal surface, but which automatically locks in all other planar orientations.

SUMMARY OF THE INVENTION

It is therefore an object of this invention to improve prior art containers.

Another object of this invention is to automatically lock a hinged door of a bait box when the door does not lie in a horizontal plane on the upper surface of the box.

It is a further object of the invention to automatically lock and release one or more doors of a container through the use of a weighted drum.

These and other objects are attained in accordance with the present invention wherein there is provided a box for transporting fishing material and the like including one or more doors which are automatically locked when not oriented as the upper horizontal surface of the box, but open when lying in such a plane. Each of the doors includes a projection which cooperates with a drum which automatically returns by force of gravity to the same orientation after the box has been shifted or turned. The drum is formed with a flange having a slot which cooperates with the projections provided on each door such that when either of the projections is at a position corresponding to the position of the slot they can pass through the slot and permit a door to be opened. On the other hand, when either of the projections are oriented in a position not corresponding to the location of the slot, the doors are automatically locked. Since the drum has a weight eccentrically mounted thereon, the slot is positioned so that it automatically returns to a predetermined location.

The improved locking means of the invention permits a user to turn the box on its side or up side-down whereby the door automatically lock and the contents of the container are safely retained therein. Moreover, handles provided on the side of the box conveniently permit a user to carry the box in transporting with both doors being oriented substantially on the sides of the bait box and thus being locked in position. The invention of the application eliminates the necessity of latching doors and provides a convenient and improved bait box for safely transporting and storing various materials such as used in fishing applications.

BRIEF DESCRIPTION OF THE DRAWINGS

Further objects of the invention, together with additional features contributing thereto and advantages accruing therefrom will be apparent from the following description of an embodiment of the invention when read in conjunction with the accompanying drawings, wherein:

FIG. 1 is an end perspective view of the bait box of the invention with parts broken away and one of the doors in an open position;

FIG. 2 is a top schematic illustration of the bait box of FIG. 1 with an upper door open;

FIG. 3 is a side sectional illustration taken along line 3 — 3 of FIG. 2 showing the drum and a door in an opened position;

FIG. 4 is a perspective illustration of the weighted drum utilized in the bait box of FIG. 1;

FIG. 5 is an end schematic illustration with parts broken away of the bait box of FIG. 1 with a door being oriented as an upper surface for opening; and FIG. 6 is an end schematic illustration with parts broken away of the bait box of FIG. 1 with the doors forming the side walls and being locked in a closed position.

DESCRIPTION OF A PREFERRED EMBODIMENT

Referring now to FIGS. 1 to 6 there is illustrated the improved box or container of the invention for carrying and transporting fishing material and the like. Although the invention is described with reference to use in conjunction with fishing material, the invention is not intended to be so limited and can be utilized in any application for transporting other types of objects.

Referring to FIG. 1 there is illustrated bait box 1 having a substantially rectangular configuration including opposed end walls 2 and a pair of side walls 3a and 3b. A handle 4 is attached by any suitable technique to one or both (not shown) of side walls 3a or 3b. A pair of hinged doors 6 and 7 forming the top and bottom of the box as shown in the orientation illustrated in FIG. 1 are attached to the side walls 3a and 3b respectively by means of conventional hinges 6' of any suitable design. The pair of end walls 2, side walls 3a and 3b, and doors 6 and 7 form an interior compartment 10 for storing and transporting materials such as fishing equipment, bait and the like. Although compartment 10 is shown as a single unitary chamber, it should be understood by those skilled in the art that compartment 10 could be divided into one or more compartments depending on the desired use of the container and the material being transported or stored.

Referring to FIGS. 1 and 2 an interior wall 11 extends within the compartment between side walls 3a and 3b and is attached thereto by any convenient securing technique such as by screws and the like. Inner wall 11 forms a drum compartment 11a to support a weighted drum in a manner to be described in detail later. The upper and lower portions of inner wall 11 is formed with a slot 11' of any suitable design to permit cooperative action in connection with the automatic locking feature of the invention.

Referring now to FIGS. 3, 4, 5 and 6 the automatic locking mechanism of the invention is best illustrated. A drum 20 of any suitable material such as a molded plastic and the like is rotatably mounted on an axle 20a transverse to end wall 2 and interior wall 11 within compartment 11a. The drum includes a base 21 and a circumferentially disposed flange 22 which is disposed at right angles to base 21 in confrontation to slot 11' at the upper and lower portions of base 21. A slot 23 is formed in flange 21 and is adapted to return to a predetermined point such as the uppermost point on the drum for all orientations of the box. Axle 25 is rotatably carried in suitable bearing means 26 of any design to mount the drum for rotational movement about an axis disposed longitudinal of the bait box.

A weight 30 formed of lead or other heavy metal is attached by any standard technique to the inner surface of base 21 offset from the axis of the rotation of the drum in diametrical alignment with slot 21. If the box is shifted the weight will act to insure that the slot 23 will return to the uppermost position of the box regardless on which side the door of the box is lying.

A mounting block 40 and 41 of any suitable design and material is respectively mounted on the inner surface of each door 6 and 7 for locking or releasing the door. Blocks 40 and 41 are oriented to be aligned with slots 11' formed in the upper and lower portion of inner wall 11 whereby rollers 42 and 43 are provided on a projection on a respective block such as on a shaft 44 to extend through slots 11' into the drum compartment 11a when the lids are in a closed position. As can be seen in FIG. 2 rollers 42 and 43 extend into the compartment 11a to be positioned adjacent the inner surface of flange 22 of the drum in all positions except when confronting slot 23 at the top of the drum.

It should be clear that when either projection 42 or 43 aligns with slot 23, the particular cover can be opened or closed without interference with the flange. Thus, doors 26 and 27 are locked when rollers 42 and 43 are not in alignment with slot 23 but when slot 23 is aligned with one of the rollers, that particular door can be opened.

From the foregoing description it should be apparent that weighted drum 20 is rotatably positioned in compartment 11a so that in any angular position of the box slot 23 is always disposed at the uppermost position of the drum. If either of the doors 6 or 7 are positioned as the upper surface of the box, the respective rollers 42 or 43 may pass through slot 23 of the drum without interference and open and close the particular door as desired. If the box is turned over or laid on its side, the door, previously on top, becomes locked because rollers 42 and 43 are maintained in position by flange 22 and is locked. Thus, doors 6 and 7 are releasable if they are positioned as the upper horizontal surface of the container. It should also be apparent doors 6 and 7 are locked when the box is carried by handle 4 since the slot 23 would then be generally aligned with the handle 24 and rollers 42 and 43 maintain both lids in a locked position.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A container for transporting and storing material comprising
    wall means defining a rectangular container,
    said wall means including a pair of oppositely disposed end walls and a pair or oppositely disposed side walls,
    said wall means further including a pivotally mounted door movable from a closed position disposed in plane perpendicular to the planes of the end walls and side walls to an opened position permitting access to said container,
    lock means operatively coupled to the door automatically permitting said pivotal movement when said door is disposed substantially in a predetermined plane and locking said door when disposed in other planes,
    the lock means includes a drum rotatably mounted about an axis and having a weight eccentrically mounted thereon, and
    said weight acting to bias said drum to a predetermined position about said axis in all angular orientations of said wall means about said axis.

2. The container of claim 1 wherein said drum includes a circumferentially disposed continuous flange having a slot,
    said door having a projection extending to confront the flange in a closed position in all planes of the door other than said predetermined plane to lock the door and being positioned adjacent said slot in said predetermined plane to permit the door to be selectively opened.

3. The container of claim 2 wherein said body means includes a second door disposed parallel to the first door and being mounted for pivotal movement;
    said second door having a projection extending to confront said flange in a closed position in all planes of the door other than a second predetermined plane and being positioned adjacent said slot in said second predetermined plane to permit the second door to be selectively opened.

4. The container of claim 1 wherein said predetermined plane passes through the upper horizontal plane of the container.

5. The container of claim 1 wherein the side walls support a handle orienting said door out of said predetermined plane when the container is carried.

* * * * *